United States Patent [19]

Sozzi

[11] 4,362,749

[45] Dec. 7, 1982

[54] SPREADABLE CHEESE HAVING CHARACTERISTICS OF CRESCENZA CHEESE

[75] Inventor: Tomaso Sozzi, Lausanne, Switzerland

[73] Assignee: Societe D'Assistance Technique pour Produits Nestle S.A., Lausanne, Switzerland

[21] Appl. No.: 250,561

[22] Filed: Apr. 3, 1981

[30] Foreign Application Priority Data

Apr. 25, 1980 [CH] Switzerland ................... 3192/80

[51] Int. Cl.$^3$ ............................................. A23C 19/02
[52] U.S. Cl. ...................................... 426/36; 426/39; 426/582
[58] Field of Search ............... 426/36, 39, 40, 582

[56] References Cited

PUBLICATIONS

Sanders, G. P., Cheese Varieties and Descriptions, U.S. Dept. of Agric., AGR Handbook No. 54 (p. 37) 1953.
Ernstrom, C. A., Mechanized Pizza Cheese Making, Manufactured Milk Products Journal, vol. 57, No. 7, 1965 (pp. 7-8).
Ernstrom et al., Continuous Manufacture of Cottage and Other Uncured Cheese Varieties, J. Dai., Sci., vol. 58, No. 7, 1975, (pp. 1008-1014).
Kosikowski F., Cheese and Fermented Milk Foods, Published by the Author, Ithaca, N.Y., 1966 (pp. 15, 65, 66, 71, 153-161 & 178-181).

*Primary Examiner*—David M. Naff
*Attorney, Agent, or Firm*—Vogt & O'Donnell

[57] ABSTRACT

A spreadable cheese having characteristics of crescenza cheese is prepared by coagulating milk with lactic acid at a pH of 5 to 5.3 to produce curd, draining the curd to a dry matter content of from 30 to 50%, adding salt to the drained curd in an amount of 0.5 to 1% of the total weight of the drained curd and allowing the salted curd to ripen until it is complete. By this process, it is possible to produce on an industrial scale a cheese having characteristics of the traditional crescenza cheese.

7 Claims, No Drawings

SPREADABLE CHEESE HAVING CHARACTERISTICS OF CRESCENZA CHEESE

This invention relates to a process for the production of a spreadable cheese of the "crescenza" type.

Crescenza is a fresh cheese typical of Northern Italy which is the only place where it is made. It has a high water content of the order of 55 to 60% and contains 50% of fat, based on dry matter. Its body is homogeneous, creamy, glossy, smooth and spreadable. It is not unlike process cheese which contains more than 60% of fats, based on dry matter. No serum is separated from it in storage. It is rich in calcium. Crescenza has a characteristic taste, mildly and clean. Any other pronounced taste, originating above all from contamination by micro-organisms, is a defect. It is made without rind in moulds approximately 2 kg in weight. Its body is friable during production and becomes spreadable after about 8 days. Italian doctors consider it to be the ideal cheese for the unwell and for children because it does not contain any emulsifying salts.

Traditional crescenza is obtained by coagulation with rennet, i.e. by enzymatic coagulation, which gives a relatively hard curd. The coagulation process is sufficiently rapid (1 to 1.5 hours) for the natural lactic ferments not to be able to intervene to any significant extent; they only act in a real sense and acidify the curd during the draining phase. This draining phase is slow (7 to 8 hours). After salting comes the ripening phase which takes about eight days. The crescenza obtained at the end of this long traditional process will keep for a maximum of eight days in a refrigerator.

The object of the present invention is to provide a process for preparing crescenza on an industrial scale whilst at the same time considerably increasing its shelf life.

The process is characterised in that, starting with milk, a curd is formed by lactic-type coagulation at a pH-value of from 5 to 5.3, the curd obtained is drained to a dry matter content of from 30 to 50%, salt is then added in a quantity of from 0.5 to 1% of the total weight and, finally, ripening is allowed to continue until it is complete.

It is in this way that, by a different cheesemaking technique it is possible to produce on an industrial scale a cheese which has all the characteristics of traditional crescenza but which will keep in a refrigerator for five to six months as opposed to eight days. In addition, the cheese thus obtained is even more spreadable than traditional crescenza. Finally, its water content may exceed 60% whereas this percentage represents a critical limit for crescenza obtained by the traditional method.

To carry out the process according to the invention, the lactic-type coagulation may be brought about by acidification either by the action of lactic ferments such as the *Streptococcus thermophilus* present in the natural state or added for the occasion or by the addition of a food-grade acid, such as for example citric acid, malic acid, lactic acid or hydrochloric acid. The coagulation phase is relatively slow (about 3 to 4 hours) and gives a relatively soft curd. The curd is preferably stirred during its formation.

The following operation (draining) may be carried out by centrifuging or by ultrafiltration for example and is continued until a product having a dry matter content of from 30 to 50% is obtained. Salt is then added in a quantity of from 0.5 to 1% of the total weight, after which the product is left to ripen, preferably in pots, until it is mature, i.e. until its development is complete. This terminal ripening phase may be carried out both at ambient temperature and at the temperature of the refrigerator.

It can clearly be seen that, for the cheesemaking point of view, the process according to the invention is unlike the traditional process for making crescenza. It has more in common with the production of petit-suisse and does in fact give a product of the "petit-suisse" type unless the parameters mentioned above are strictly observed.

Thus, if the lactic-type coagulation process takes place at an incorrect pH-value, for example at pH 4.5 to 4.8, a type of "petit-suisse" is obtained, being more or less salty according to the amount of salt added before ripening.

If the lactic-type coagulation process is carried out in the correct pH range between 5 and 5.3 but if no salt is added before ripening, the product obtained has an unpleasant granular texture.

The same unpleasant granular texture appears if the water content is insufficient irrespective of the amount of salt added.

In one preferred embodiment of the process according to the invention, pasteurised whole or partially skimmed milk is coagulated by the addition of *Streptococcus thermophilus* ferments in a quantity of 1% or by the addition of lactic acid. Essentially for reasons of cheesemaking legislation, small quantities of rennet may also be added although they do not have any significant bearing on the coagulation process. The curd is formed at a pH of the order of 5.2 and is stirred during its formation. The product is then drained by centrifuging until it has a dry matter content of from 30 to 50%, after which salt is added in a quantity of from 0.5 to 1% of the total weight. The product obtained is then put into pots and placed in refrigerators at a few degrees Centigrade for 24 hours during which time the ripening process takes place and is completed.

As mentioned at the beginning of the description, the crescenza obtained by the process according to the invention is easier to spread than traditional crescenza and, above all, may be kept in a refrigerator for five to six months. This latter feature is attributable to the fact that the new technology used in accordance with the present invention makes it possible to control fermentation and to eliminate the secondary infection or contamination which so seriously affects the keeping properties of the traditional product. In addition, there is no longer any danger of contamination by pathogenic micro-organisms. Finally and again as mentioned above, the dry matter content of the crescenza obtained by the process according to the invention may be reduced without difficulty to 30% whereas the dry matter content of traditional crescenza must not fall below 40%.

The process according to the invention is illustrated by the following Examples in which the percentages quoted represent percentages by weight.

EXAMPLE 1

To whole milk kept at a temperature of 40° C. is added 1% of lactic ferments, namely 1% of a 3 h culture of *Streptococcus thermophilus*, based on the milk. Rennet (strength 10,000) is also added. The milk is then left to coagulate with gentle stirring at a pH value of 5.1. Coagulation takes four hours. The curd obtained is then drained in a centrifuge until it has a dry matter content of 40%, after which cooking salt is added in a quantity of 0.7% based on the drained curd. The curd is then put into pots and placed in a refrigerator at approximately 4° C. After 24 hours the ripening process is complete. After it has returned to ambient temperature, the cheese obtained resembles crescenza in its appearance and properties, only it spreads more easily.

EXAMPLE 2

The procedure is as described in Example 1, except that the draining phase is only continued to a dry matter content of 30%. The cheese obtained still has the characteristics of crescenza; it is easier to spread and lighter.

COMPARISON EXAMPLES (a) The procedure is as in Example 1 except that a larger quantity of lactic ferments is added to allow coagulation to take place at a pH-value of 4.7. The cheese obtained no longer has the appearance of a crescenza but is more like "petit-suisse." In addition, it is found on tasting to have an unpleasant granular texture.

(b) The procedure is as described in Example 1 except that no salt is added to the drained curd.

Although the coagulation pH is correct, the cheese obtained is like the cheese obtained in the preceding Comparison Example and again has an unpleasant granular texture.

(c) The procedure is as described in Example 1, except that the curd is drained to a dry matter content of 60%.

The cheese obtained again has an unpleasant granular texture.

EXAMPLE 3

The procedure is as described in Example 1, except that acidification of the milk is carried out continuously. The milk is acidified in a tank to pH 5.1 after which the same quantity of milk is added and removed to keep the pH-value constant at 5.1 in the tank. Acidification is stopped by cooling in a refrigerator.

EXAMPLE 4

The procedure is as described in Example 1, except that acidification is produced by the addition of lactic acid and that 1% of salt is added as opposed to 0.7%. The product obtained has the same texture and physical qualities but not the same bouquet as the product of Example 1, but is just a little more salty.

EXAMPLE 5

The procedure is as described in Example 1, except that acidification with the lactic culture is only continued to a pH-value of from 5.8 to 6.0, acidification is terminated by the addition of lactic acid and 0.5% of salt is added as opposed to 0.7%. The product obtained has the same appearance, the same texture and the same physical properties as the products of Examples 1 to 4 although its bouquet is distinctly more pleasant than that of the product of Example 4. Its taste is just a little less salty than that of the product of Example 1.

EXAMPLE 6

The procedure is as described in Example 1 except that, instead of draining the curd in a centrifuge, the whey is separated from the curd by ultrafiltration. The product obtained is comparable in all respects with the product of Example 1.

I claim:

1. A process for the production of a spreadable cheese having substantially all the traditional characteristics of crescenza cheese, which comprises forming a curd from milk by coagulation with lactic acid at a pH-value of from 5 to 5.3, draining the curd to a dry matter content of from 30 to 50%, thereafter adding salt to the drained curd in an amount from 0.5 to 1% of the total weight of the drained curd and allowing the salted curd to ripen until it is complete.

2. A process as claimed in claim 1, wherein the curd is stirred during its formation.

3. A process as claimed in claim 1, wherein the curd is drained by centrifugation.

4. A process as claimed in claim 1, characterised in that the lactic coagulation is brought about by *Streptococcus thermophilus*.

5. A process as claimed in claim 1, wherein the curd is placed in pots before ripening.

6. A process as claimed in claim 1, wherein ripening lasts 24 hours in a refrigerator.

7. A spreadable cheese having the characteristics of crescenza cheese obtained by the process claimed in claim 1.

* * * * *